US010996626B2

(12) United States Patent
Park

(10) Patent No.: US 10,996,626 B2
(45) Date of Patent: May 4, 2021

(54) APPARATUS AND METHOD FOR CAPTURING FOURIER HOLOGRAM

(71) Applicant: ELECTRONICS AND TELECOMMUNICATIONS RESEARCH INSTITUTE, Daejeon (KR)

(72) Inventor: Min-Sik Park, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 252 days.

(21) Appl. No.: 15/938,834

(22) Filed: Mar. 28, 2018

(65) Prior Publication Data
US 2018/0284694 A1  Oct. 4, 2018

(30) Foreign Application Priority Data
Mar. 28, 2017 (KR) ........................ 10-2017-0039456

(51) Int. Cl.
G03H 1/16 (2006.01)
G03H 1/08 (2006.01)
G03H 1/22 (2006.01)

(52) U.S. Cl.
CPC ............ G03H 1/16 (2013.01); G03H 1/0808 (2013.01); G03H 1/0841 (2013.01); G03H 1/2294 (2013.01); G03H 2222/52 (2013.01)

(58) Field of Classification Search
None
See application file for complete search history.

(56) References Cited

U.S. PATENT DOCUMENTS 5,889,599 A * 3/1999 Takemori ............. G03H 1/0404
                                                       359/30
2015/0177686 A1  6/2015 Lee et al.
2015/0234350 A1  8/2015 Park et al.

FOREIGN PATENT DOCUMENTS

JP      2014067017 A      4/2014
JP         5781805 B2     9/2015
KR   10-2007-0016285 A    2/2007
(Continued)

OTHER PUBLICATIONS

P. L. Makowski et al., "Synthetic aperture Fourier holography for wideangle holographic display of real scenes", Applied Optics, Apr. 20, 2015, pp. 3658-3665, vol. 54, No. 12, Optical Society of America.

Primary Examiner — Derek S. Chapel

(57) ABSTRACT

An apparatus for capturing a Fourier hologram splits a coherent light source into an object beam and a reference beam, sets a distance of a virtual focal plane of a subject, generates spherical wave field data propagated from a point source of the virtual focal plane to a central coordinate plane of a spatial light modulator, generates a spherical wave field on a space from the spherical wave field data and the reference beam by the spatial light modulator, synthesizes an object wave field generated by reflecting the object beam by the subject and the spherical wave field with each other so that an interference pattern is formed on the image sensor face, captures the interference pattern formed on the image sensor face, and then performs Fourier transformation to calculate an object wave field formed on the focal plane of the subject.

7 Claims, 6 Drawing Sheets

(56) References Cited

FOREIGN PATENT DOCUMENTS

KR  10-2012-0110218 A   10/2012
WO  WO2015040925 A1    3/2015

* cited by examiner

APPARATUS AND METHOD FOR CAPTURING FOURIER HOLOGRAM

CROSS-REFERENCE TO RELATED APPLICATION

This application claims priority to and the benefit of Korean Patent Application No. 10-2017-0039456 filed in the Korean Intellectual Property Office on Mar. 28, 2017, the entire contents of which are incorporated herein by reference.

BACKGROUND OF THE INVENTION

(a) Field of the Invention

The present invention relates to an apparatus and a method for capturing a Fourier hologram.

(b) Description of the Related Art

An apparatus for capturing a Fourier hologram according to the related art captures a Fourier hologram by positioning a Mach-Zehnder interferometry on an optical table, splitting light generated from a coherent light source into an object beam and a reference beam, illuminating the object beam and the reference beam to a subject and a mirror, respectively, and then photographing an interference pattern generated by the reference light passing through the mirror and a convex lens and the object beam reflected from the subject.

In such a method for capturing a Fourier hologram according to the related art, the interferometry and the subject should be installed together on the optical table, and the Fourier hologram may thus be captured in only a limited environment such as the optical table. In addition, since a focal length of the convex lens is fixed and the number of focal planes is one, a Fourier hologram may not be captured on a focal plane desired by a user, and an auto-focusing function is impossible.

SUMMARY OF THE INVENTION

The present invention has been made in an effort to provide an apparatus and a method for capturing a Fourier hologram having advantageous of allowing a user to freely capture a Fourier hologram for a subject.

Further, the present invention has been made in an effort to provide and an apparatus and a method for capturing a Fourier hologram having advantageous of freely setting a focal plane and providing an auto-focusing function.

An exemplary embodiment of the present invention provides an apparatus for capturing a Fourier hologram. The apparatus for capturing a Fourier hologram includes a light source generating unit, a light source splitting unit, a phase generating unit, a wave field synthesizing unit, an image capturing unit, and a control unit. The light source generating unit generates a coherent light source. The light source splitting unit splits the coherent light source into an object beam and a reference beam. The phase generating unit generates spherical wave field data propagated from a point source of a virtual focal plane of a subject to a virtual coordinate plane on an optical path between a focal plane of the subject and an image sensor face, and includes a spatial light modulator generating a spherical wave field on a space using the reference beam and the spherical wave field data. The wave field synthesizing unit synthesizes an object wave field generated by reflecting the object beam by the subject and the spherical wave field with each other. The image capturing unit captures an interference pattern formed on the image sensor face by the synthesized spherical wave field and object wave field. The control unit performs Fourier transformation on an image of the interference pattern to calculate an object wave field formed on the focal plane of the subject, and performs auto-focusing using an absolute value image of the calculated object wave field.

The control unit may change a position of the virtual focal plane for the purpose of the auto-focusing using a contrast value of the absolute value image of the calculated object wave field.

The control unit may change the position of the virtual focal plane on the basis of a comparison result between the contrast value of the absolute value image of the calculated object wave field and a contrast value of an absolute value image of the previously calculated object wave field.

The control unit may change a distance from the focal plane to the image sensor face by a set increment value and update the increment value until the contrast value of the absolute value image of the calculated object wave field becomes maximum, and a distance from the position of the virtual focal plane to a central coordinate plane of the spatial light modulator that is virtually positioned may be calculated on the basis of the distance from the focal plane to the image sensor face.

The control unit may update the increment value by a value obtained by dividing a difference between the contrast value of the absolute value image of the calculated object wave field and a contrast value of an absolute value image of the previously calculated object wave field by a set increment ratio.

The phase generating unit may further include: a spherical wave field data generator generating the spherical wave field data and outputting the spherical wave field data to the spatial light modulator; and a beam splitter making the reference beam split by the light source splitting unit incident to the spatial light modulator.

The phase generating unit may further include a filtering optical system removing noise from the spherical wave field.

The wave field synthesizing unit may include: a first beam splitter forming the spherical wave field and the object wave field on the image sensor face; and a second beam splitter transmitting the object beam to the subject and outputting the object wave field reflected from the subject to the first beam splitter.

Another exemplary embodiment of the present invention provides an apparatus for capturing a Fourier hologram including a light source generating unit, a light source splitting unit, a phase generating unit, a wave field synthesizing unit, an image capturing unit, and a control unit. The light source generating unit generates a coherent light source. The light source splitting unit splits the coherent light source into an object beam and a reference beam. The phase generating unit generates spherical wave field data propagated from a point source of a virtual focal plane of a subject to a virtual coordinate plane on an optical path between a focal plane of the subject and an image sensor face, and includes a spatial light modulator generating a spherical wave field on a space using the spherical wave field data and the reference beam. The wave field synthesizing unit controls paths of the spherical wave field and an object wave field generated by reflecting the object beam by the subject to form an interference pattern on the image sensor face. The image capturing unit captures the interference pattern. The control unit performs Fourier transformation on an image of the interference pattern to calculate an object wave field formed on the focal plane of the subject, captures an absolute value image of the calculated object wave field, and controls a position of the virtual focal plane depending on an input value from a user.

The phase generating unit may further include: a spherical wave field data generator generating the spherical wave field data and outputting the spherical wave field data to the spatial light modulator; and a beam splitter making the reference beam incident to the spatial light modulator.

The phase generating unit may further include a filtering optical system removing noise from the spherical wave field.

The wave field synthesizing unit may include: a first beam splitter forming the spherical wave field and the object wave field on the image sensor face; and a second beam splitter transmitting the object beam to the subject and outputting the object wave field reflected from the subject to the first beam splitter.

Yet another exemplary embodiment of the present invention provides a method for capturing a Fourier hologram by an apparatus capturing a Fourier hologram. The method for capturing a Fourier hologram by an apparatus capturing a Fourier hologram includes: splitting a coherent light source into an object beam and a reference beam; setting a distance of a virtual focal plane of a subject; generating spherical wave field data propagated from a point source of the virtual focal plane of the subject to a virtual coordinate plane positioned on an optical path between a focal plane of the subject and an image sensor face; generating a spherical wave field on a space from the spherical wave field data and the reference beam through a spatial light modulator; synthesizing an object wave field generated by reflecting the object beam by the subject and the spherical wave field with each other so that an interference pattern is formed on the image sensor face; capturing the interference pattern; and performing Fourier transformation on an image of the interference pattern to calculate an object wave field formed on the focal plane of the subject.

The method for capturing a Fourier hologram may further include performing auto-focusing using an absolute value image of the calculated object wave field.

The performing of the auto-focusing may include changing a position of the virtual focal plane for the purpose of the auto-focusing using a contrast value of the absolute value image of the calculated object wave field.

The changing may include: changing a distance from the focal plane to the image sensor face by a set increment value on the basis of comparison between the contrast value of the absolute value image of the calculated object wave field and a contrast value of an absolute value image of the previously calculated object wave field; and updating the increment value until the contrast value of the absolute value image of the calculated object wave field becomes maximum, and the setting may include changing the distance of the virtual focal plane on the basis of the distance from the focal plane to the image sensor face.

The changing may include: changing a distance from the focal plane to the image sensor face by a set increment value through comparison between the contrast value of the absolute value image of the calculated object wave field and a contrast value of an absolute value image of the previously calculated object wave field; and updating the increment value by a value obtained by dividing a difference between the contrast value of the absolute value image of the calculated object wave field and the contrast value of the absolute value image of the previously calculated object wave field by a set increment ratio, and the setting may include changing the distance of the virtual focal plane on the basis of the distance from the focal plane to the image sensor face.

The method for capturing a Fourier hologram may further include removing noise from the spherical wave field.

The setting may include changing the distance of the virtual focal plane depending on an input value from a user.

The synthesizing may include: transmitting the object beam to the subject and outputting the object wave field reflected from the subject to a second beam splitter, through a first beam splitter; and forming the spherical wave field and the object wave field on the image sensor face through the second beam splitter.

DETAILED DESCRIPTION OF THE EMBODIMENTS

Figure 1:
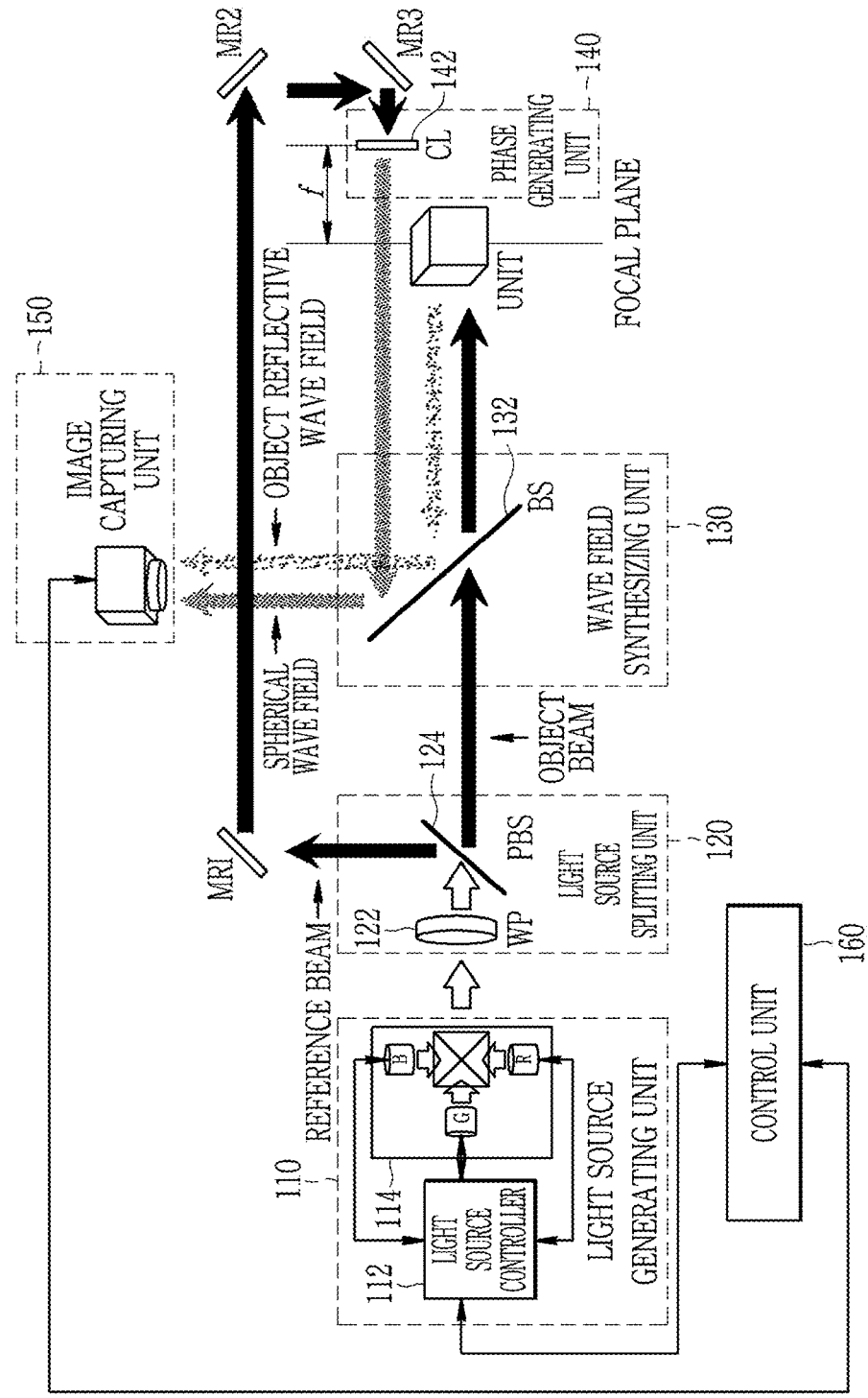
FIG. 1 is a view showing an apparatus for capturing a color Fourier hologram according to the related art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and the claims, unless explicitly described to the contrary, the word "comprise" and variations such as "comprises" or "comprising", will be understood to imply the inclusion of stated elements but not the exclusion of any other elements.

Next, an apparatus and a method for capturing a Fourier hologram according to an exemplary embodiment of the present invention will be described in detail with reference to the drawings.

FIG. 1 is a view showing an apparatus for capturing a color Fourier hologram according to the related art.

Referring to FIG. 1, an apparatus 100 for capturing a color Fourier hologram includes a light source generating unit 110, a light source splitting unit 120, a wave field synthesizing unit 130, a phase generating unit 140, an image capturing unit 150, and a control unit 160.

The light source generating unit 110 includes a light source controller 112 and a coherent light source 114. The coherent light source 114 generates coherent light, and, for example, laser light sources of red, green, and blue may be used as the coherent light source 114. Hereinafter, a case in which the coherent light source 114 is the laser light sources 114 of red, green, and blue is described.

The light source controller 112 controls the laser light sources 114 of red, green, and blue so as to capture a color Fourier hologram. The light source controller 112 may control output brightness and turn-on/off of the laser light sources 114 of red, green, and blue so as to capture the color Fourier hologram.

The light source splitting unit 120 splits light generated from the laser light sources 114 of red, green, and blue into a reference beam and an object beam required for generating an interference pattern. The light source splitting unit 120 may include a half-wave plate (WP) 122 and a polarization beam splitter (PBS) 124. The WP 122 changes a polarization direction by rotation. The PBS 124 transmits or reflects light passing through the WP 122 therethrough or therefrom depending on the polarization direction to send some of the light to a subject and send the other of the light to a mirror MR1. In this case, the light sent to the subject through the PBS 124 is the object beam, and the light sent to the mirror MR1 through the PBS 124 is the reference beam.

The reference beam split by the light source splitting unit 120 is reflected by the mirror MR1, and the reference beam reflected by the mirror MR1 is input to the phase generating unit 140 through one or more mirrors MR2 or MR3.

The phase generating unit 140 receives the reference beam, and generates a point source on a focal plane, which is a focal length f of a convex lens (CL) 142 through the CL 142 to generate a spherical wave field.

The wave field synthesizing unit 130 may include a beam splitter (BS) 132. The BS 132 synthesizes the spherical wave field generated by the phase generating unit 140 and an object reflective wave field formed by reflecting the object beam by the subject with each other so that an interference pattern may be formed on a sensor face of the image capturing unit 150.

The image capturing unit 150 may include an image sensor such as a charge coupled device (CCD) or a complementary metal oxide semiconductor (CMOS), and captures an interference pattern generated on a sensor face of the image sensor.

The control unit 160 performs Fourier transformation on the interference pattern captured by the image capturing unit 150 to capture a color Fourier hologram, and stores the captured color Fourier hologram. The control unit 160 controls turn-on/off of the respective laser light sources 114 of red, green, and blue to allow the color Fourier hologram to be captured.

As described above, the apparatus 100 for capturing a Fourier hologram according to the related art is generally installed together with the subject on an optical table and photographing the subject through the reference beam and the object beam having a predetermined horizontal height. Therefore, it is not easy to steer the reference beam and the object beam in a vertical direction, such that it is difficult to capture a Fourier hologram of a vertical parallax for the subject. In addition, since the focal length f of the CL 142 of the phase generating unit 140 is fixed, the Fourier hologram can not but be captured from the point source positioned on the fixed focal plane, such that it is difficult to implement an auto-focusing function.

According to an exemplary embodiment of the present invention, an apparatus for capturing a color Fourier hologram capable of allowing a user to freely capture a Fourier hologram for a subject, freely setting a focal plane, and providing an auto-focusing function is provided.

Figure 2:
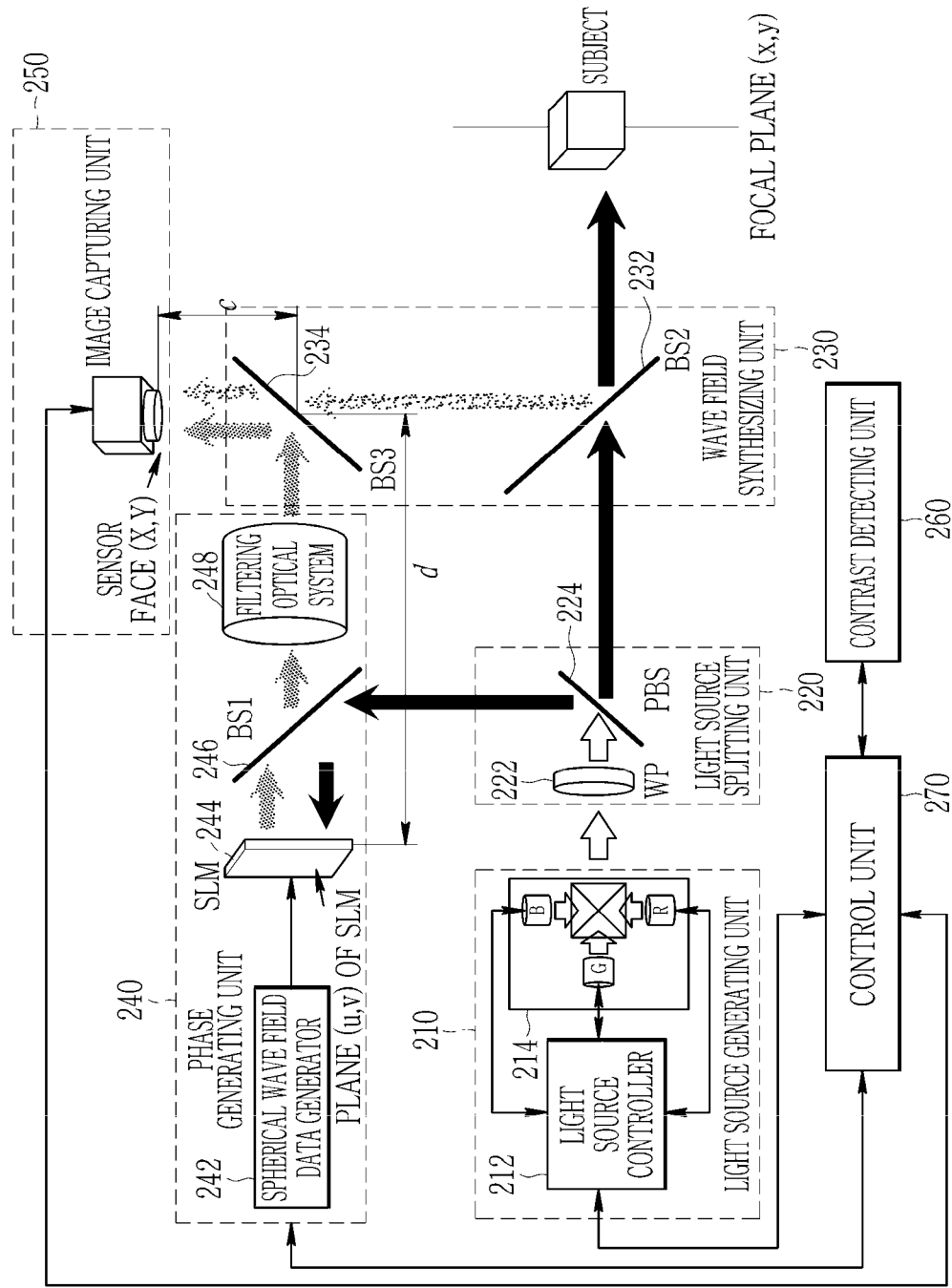
FIG. 2 is a view showing an apparatus for capturing a color Fourier hologram according to an exemplary embodiment of the present invention.

FIG. 2 is a view showing an apparatus for capturing a color Fourier hologram according to an exemplary embodiment of the present invention.

Referring to FIG. 2, an apparatus 200 for capturing a color Fourier hologram includes a light source generating unit 210, a light source splitting unit 220, a wave field synthesizing unit 230, a phase generating unit 240, an image capturing unit 250, a contrast detecting unit 260, and a control unit 270.

The light source generating unit 210, the light source splitting unit 220, and the image capturing unit 250 perform the same functions as those of the light source generating unit 110, the light source splitting unit 120, and the image capturing unit 150 shown in FIG. 1, and a description for the light source generating unit 210, the light source splitting unit 220, and the image capturing unit 250 is thus omitted.

According to an exemplary embodiment of the present invention, the wave field synthesizing unit 230 and the phase generating unit 240 are configured to be different from those of FIG. 1, such that the apparatus 200 for capturing a color Fourier hologram may be separated independently from a subject. Therefore, the apparatus 200 for capturing a color Fourier hologram may photograph the subject at various angles.

In detail, the phase generating unit 240 may include a spherical wave field data generator 242, a spatial light modulator (SLM) 244, a beam splitter 1 (BS1) 246, and a filtering optical system 248.

The BS1 246 reflects a reference beam split by the light source splitting unit 220 to the SLM 244, and transmits a spherical wave field modulated from the SLM 244 to the filtering optical system 248.

The spherical wave field data generator 242 generates spherical wave field data (SP (u,v)) propagated from a point source of a virtual focal plane of the subject virtually positioned by a user to a plane (u,v) of the SLM 244, depending on Equation 1, and outputs the generated spherical wave field data (SP (u,v)) to the SLM 244.

$$SP = e^{j\frac{2\pi}{\lambda}\left(\frac{u^2+v^2}{2s}\right)} \qquad \text{(Equation 1)}$$

In Equation 1, (u,v) indicates a rectangular coordinate plane of the SLM 244, and λ indicates a wavelength of a light source. In addition, s indicates a distance from the plane (u,v) of the SLM 244 to the virtual focal plane of the subject when it is assumed that the SLM 244 exists on an optical path between an image sensor face (X,Y) of the image capturing unit 250 and a focal plane (x,y) of the subject. In this case, the distance s may be represented by Equation 2.

$$s = b - d \qquad \text{(Equation 2)}$$

In Equation 2, b indicates a distance from the virtual focal plane of the subject to a BS3 234 of the wave field synthesizing unit 230, and d indicates a distance from the SLM 244 to the BS3 234.

That is, when it is assumed that the SLM 244 exists on the optical path between the image sensor face (X,Y) of the image capturing unit 250 and the focal plane (x,y) of the subject, the distance s is equal to a value obtained by subtracting d from b.

Therefore, when the user arbitrarily sets the distance s, a distance of the focal plane of the subject may be freely adjusted, and when the distance d is fixed, the distance s may be adjusted by adjusting the distance b. In this case, the distance may be adjusted by changing a position of the virtual focal plane of the subject.

The SLM 244 of the phase generating unit 240 spatial-light-modulates the spherical wave field data (SP(u,v)) generated by the spherical wave field data generator 242 by the reference beam split by the light source splitting unit 220 to generate a spherical wave field propagated from the point source of the virtual focal plane on a space. This may substitute for a function of the phase generating unit 140 generating the point source using the CL 142 in FIG. 1.

The spherical wave field output from the SLM 244 of the phase generating unit 240 includes a 0-order or second-order or more diffraction wave field, and the filtering optical system 248 including a 4f optical system and a filter aperture may be used in order to remove such a noise.

The filtering optical system 248 removes the noise from the spherical wave field output from the SLM 244, and then outputs the spherical wave field from which the noise is removed to the BS3 234 of the wave field synthesizing unit 230.

The wave field synthesizing unit 230 includes a BS2 232 and the BS3 234. The BS2 232 transmits an object beam split by the light source splitting unit 220 to the subject, and reflects an object wave field reflected by the subject to the BS3 234. The BS3 234 transmits the object wave field to the sensor face of the image capturing unit 250, and reflects the spherical wave field modulated from the SLM 244 of the phase generating unit 240 to the image sensor face (X,Y) of the image capturing unit 250. The object wave field and the spherical wave field form an interference pattern on the image sensor face (X,Y) of the image capturing unit 250.

The image capturing unit 250 captures the interference pattern formed by the object wave field and the spherical wave field, and transfers the captured interference pattern to the control unit 270.

The control unit 270 performs Fourier transformation on an interference pattern image I(X,Y) obtained from the image sensor face (X,Y) of the image capturing unit 250 as represented by Equation 3 to calculate an object wave field U(x,y) formed on the focal plane (x,y) of the subject, and transfers an absolute value image of the calculated object wave field U(x,y) to the contrast detecting unit 260.

$$U(x, y) = \int \int I(X, Y)e^{-i\frac{2\pi}{\lambda}\frac{(xX+yY)}{z}} dX\, dY \quad \text{(Equation 3)}$$

The contrast detecting unit 260 calculates a contrast value of the absolute value image of the calculated object wave field U(x,y). The contrast detecting unit 260 compares the contrast value of the absolute value image of the calculated object wave field U(x,y) and a contrast value of an absolute value image of the previously calculated object wave field U(x,y) with each other to decrease or increase a distance z that is previously set. The distance z is set as represented by Equation 4, and indicates a distance from the focal plane (x,y) of the subject to the image sensor face (X,Y).

$$z=b+c \quad \text{(Equation 4)}$$

Here, b indicates a distance from the virtual focal plane of the subject to the center of the BS3 234 of the wave field synthesizing unit 230, and c indicates a distance from the center of the BS3 234 to the image sensor face (X,Y).

The control unit 270 controls the phase generating unit 240 so that the phase generating unit 240 newly generates a spherical wave field at a changed distance z. The control unit 270 again captures a new interference pattern image formed by the spherical wave field generated at the changed distance z through the image capturing unit 250. This process may be repeated until the contrast value of the absolute value image of the object wave field becomes maximum.

A relationship between the distance s and the distance z from the focal plane (x,y) of the subject to the image sensor face (X,Y) may be represented by Equation 5 on the basis of Equation 2 and Equation 4.

$$s=z-c-d \quad \text{(Equation 5)}$$

When positions of the respective configuration modules of the apparatus 200 for capturing a color Fourier hologram are fixed, the distance c and the distance d are fixed. Therefore, when the distance z is set, the distance s input into Equation 1 is calculated by Equation 5.

The contrast detecting unit 260 calculates a contrast value from the absolute value image of the object wave field transferred from the control unit 270 in order to automatically find a distance of the focal plane (x,y) existing at a position of the subject. As a method for calculating the contrast value in the contrast detecting unit 260, various existing methods for processing an image may be used. For example, a method for finding edges of a corresponding image using a second-order differential operator such as Laplacian, Laplacian of Gaussian (LoG), Differential of Gaussian (DoG), or the like, and calculating a contrast value of the corresponding image using the sum of the numbers of pixels corresponding to the edges may be an example.

Meanwhile, although a case in which a configuration module of the contrast detecting unit 260 separately exists is described in an exemplary embodiment of the present invention, the control unit 270 may also perform a function of the contrast detecting unit 260.

According to another exemplary embodiment of the present invention, when it is assumed to an auto-focusing function is not present, the configuration module of the contrast detecting unit 260 may be omitted. The control unit 270 may receive a value of the distance s input from the user, and transfers the value of the distance s to the phase generating unit 240. The phase generating unit 240 controls the spherical wave field depending on the distance s transferred from the control unit 270, such that the distance of the focal plane may be adjusted.

Figure 3:
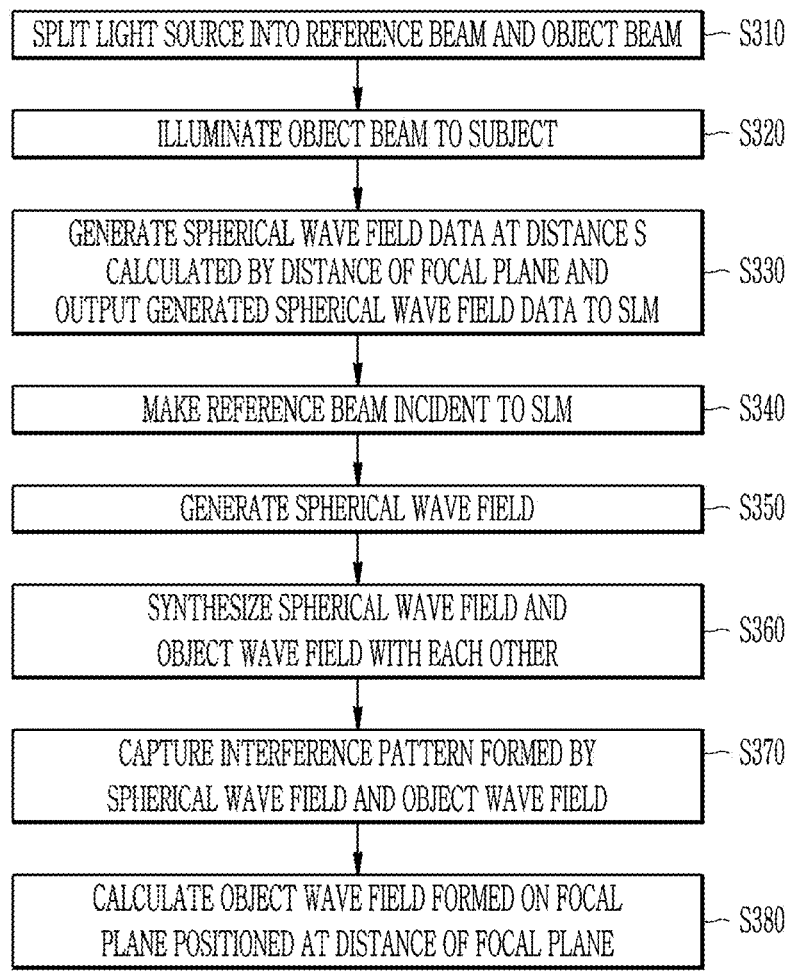
FIG. 3 is a flow chart showing a method for capturing an absolute value image of an object wave field by the apparatus for capturing a color Fourier hologram shown in FIG. 2.

FIG. 3 is a flow chart showing a method for capturing an absolute value image of an object wave field by the apparatus for capturing a color Fourier hologram shown in FIG. 2.

Referring to FIG. 3, the apparatus 200 for capturing a color Fourier hologram splits a light source generated by the light source generating unit 210 into the reference beam and the object beam through the light source splitting unit 220 (S310).

The apparatus 200 for capturing a color Fourier hologram illuminates the split object beam to the subject (S320), generates spherical wave field data by Equation 1 at a distance s calculated by a distance $z_0$ of a focal plane that is initially set through the phase generating unit 240 and outputs the generated spherical wave field data to the SLM 244 (S330), and makes the split reference beam incident to the SLM 244 to generate the spherical wave field on a space (S340 and S350).

The apparatus 200 for capturing a color Fourier hologram synthesizes the spherical wave field generated by the SLM 244 and an object wave field reflected by the subject with each other through the wave field synthesizing unit 230 to allow an interference pattern to be formed on the image sensor face of the image capturing unit 250 (S360).

The apparatus 200 for capturing a color Fourier hologram captures the interference pattern formed on the image sensor face (S370).

The apparatus 200 for capturing a color Fourier hologram calculates an object wave field formed on a focal plane positioned at the distance $z_0$ of the focal plane using Equation 3 from an image of the captured interference pattern (S380).

Figure 4:
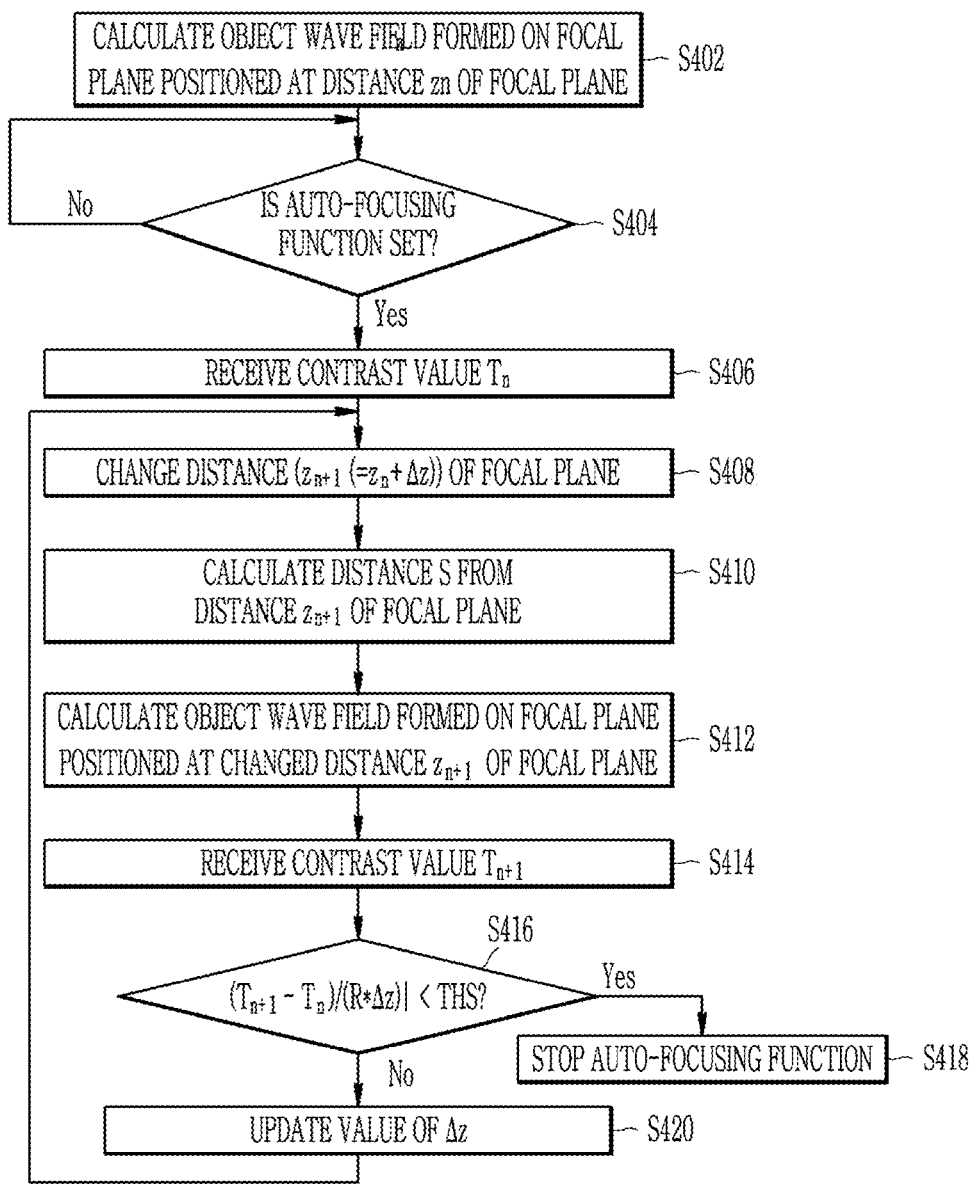
FIG. 4 is a flow chart showing a method for adjusting a distance of a focal plane by the apparatus for capturing a color Fourier hologram shown in FIG. 2.

FIG. 4 is a flow chart showing a method for adjusting a distance of a focal plane by the apparatus for capturing a color Fourier hologram shown in FIG. 2.

Referring to FIG. 4, the control unit 270 calculates an object wave field formed on a focal plane positioned at a distance $z_n$ of the focal plane through S310 to S380 described with reference to FIG. 3 (S402). At the time of an initial operation, n=0.

When an auto-focusing function is set (S404), the control unit 270 may transfer an absolute value image of the object wave field formed on the focal plane positioned at the distance $z_n$ of the focal plane to the contrast detecting unit 260 to allow a contrast value $T_n$ to be calculated from the corresponding absolute value image.

The control unit 270 receives the contrast value $T_n$ from the contrast detecting unit 260 (S406).

Then, the control unit 270 changes a distance $z_{n+1}(=z_n+\Delta z)$ of the focal plane (S408), calculates the distance s by Equation 5 from the changed distance $z_{n+1}$ of the focal plane (S410), and transfers the calculated distance s to the phase generating unit 240. Here, when n=0, $\Delta z$ may be a value preset by the user.

Then, the control unit 270 may calculate an object wave field formed on a focal plane positioned at the changed distance $z_{n+1}(=z_n+\Delta z)$ of the focal plane through S330 to S380 as described with reference to FIG. 3 (S412).

The control unit 270 may transfer an absolute value image of the object wave field formed on the focal plane positioned at the changed distance $z_{n+1}(=z_n+\Delta z)$ of the focal plane to the contrast detecting unit 260 to allow a contrast value $T_{n+1}$ to be calculated from the corresponding absolute value image.

The control unit 270 receives the contrast value $T_{n+1}$ from the contrast detecting unit 260 (S414).

The control unit 270 determines whether or not to stop the auto-focusing function depending on whether or not a condition represented by Equation 6 is satisfied.

$$(T_{n+1}-T_n)/(R*\Delta z)|<THS \quad \text{(Equation 6)}$$

Here, $\Delta z$ indicates a distance increment value, THS indicates an end threshold value, and R indicates an increment ratio. $\Delta z$, THS, and R may be arbitrarily set by the user at an early stage.

The control unit 270 stops the auto-focusing function (S418) when the condition of Equation 6 is satisfied (S416), and updates a value of $\Delta z$ as represented by Equation 7 (S420) when the condition of Equation 6 is not satisfied (S416).

$$\Delta z=(T_{n+1}-T_n)/R \quad \text{(Equation 7)}$$

The control unit 270 changes the distance $z_{n+1}(=z_n+\Delta z)$ of the focal plane on the basis of the updated value of $\Delta z$ (S408), and repeats S410 to S420.

In this way, the apparatus 200 for capturing a color Fourier hologram may perform the auto-focusing function.

Figure 5:
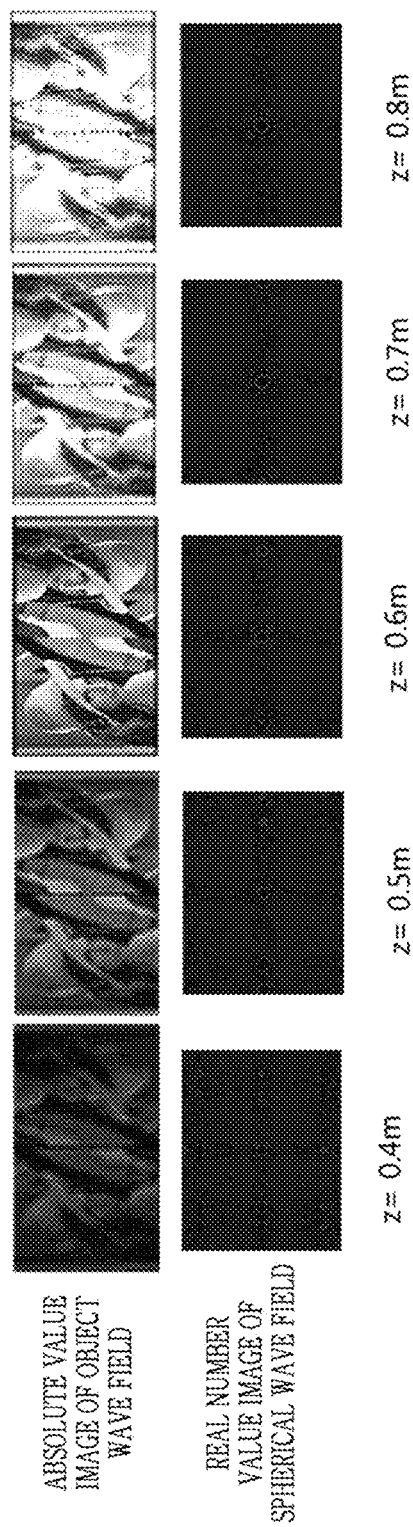
FIG. 5 is views showing real number value images of a spherical wave field and absolute value images of an object wave field depending on a distance of a focal plane according to an exemplary embodiment of the present invention.
Figure 6:
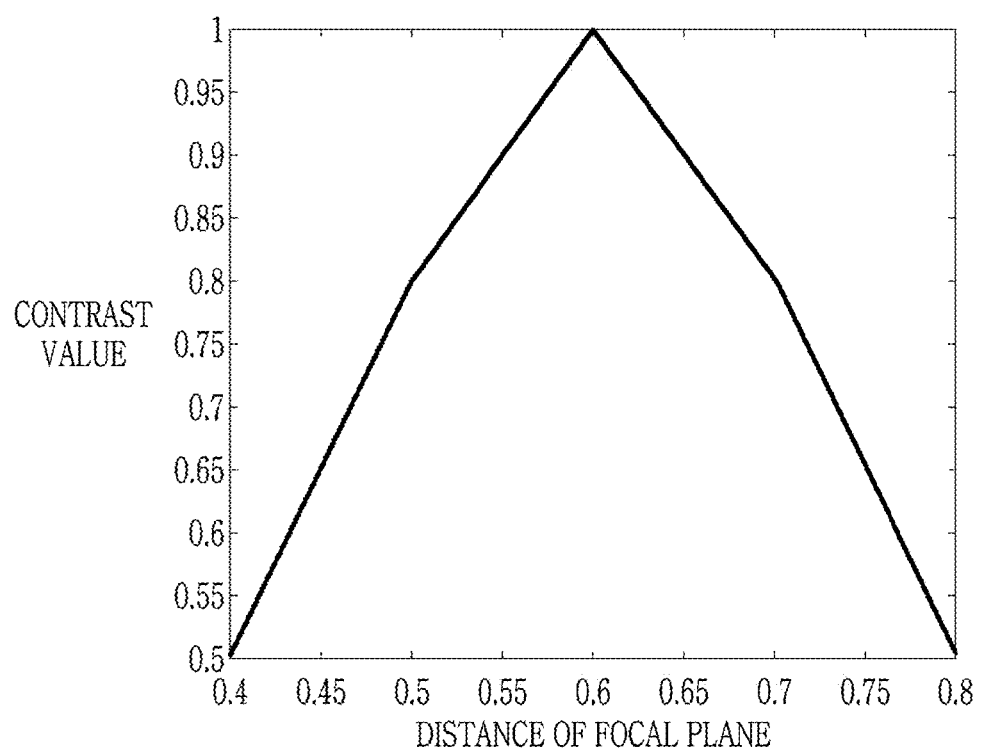
FIG. 6 is a view showing contrast values calculated from the absolute value images of the object wave field shown in FIG. 5.

FIG. 5 is views showing real number value images of a spherical wave field and absolute value images of an object wave field depending on a distance of a focal plane according to an exemplary embodiment of the present invention, and FIG. 6 is a view showing contrast values calculated from the absolute value images of the object wave field shown in FIG. 5.

A subject used in FIGS. 5 and 6 is a two-dimensional image, and it is assumed that a two-dimensional image is put at a position at which a distance z of a focal plane is 0.6 m.

As shown in FIGS. 5 and 6, it may be appreciated that when the distance z is 0.6 m, an absolute value image of an object wave field is clearest and a contrast value of the absolute value image of the object wave field is largest.

According to an exemplary embodiment of the present invention, an apparatus for capturing a Fourier hologram may be configured to be independent from a subject and be movable, and may thus easily capture a Fourier hologram for the subject at various angles.

As described above, the apparatus 200 for capturing a color Fourier hologram according to an exemplary embodiment of the present invention may adjust the distance z of the focal plane so as to capture the clearest absolute value image of the object wave field.

Although the exemplary embodiment of the present invention has been described in detail hereinabove, the scope of the present invention is not limited thereto. That is, several modifications and alterations made by a person of ordinary skill in the art using a basic concept of the present invention as defined in the claims fall within the scope of the present invention.

What is claimed is:

1. An apparatus for capturing a Fourier hologram, comprising:
   a light source generating unit generating a coherent light source;
   a light source splitting unit splitting the coherent light source into an object beam and a reference beam;
   a phase generating unit generating spherical wave field data propagated from a point source of a virtual focal plane of a subject to a virtual coordinate plane on an optical path between a focal plane of the subject and an image sensor face and including a spatial light modulator generating a spherical wave field on a space using the reference beam and the spherical wave field data;
   a wave field synthesizing unit synthesizing an object wave field generated by reflecting the object beam by the subject and the spherical wave field with each other;
   an image capturing unit capturing an interference pattern formed on the image sensor face by the synthesized spherical wave field and object wave field; and
   a controller performing Fourier transformation on an image of the interference pattern to calculate an object wave field formed on the focal plane of the subject, and performing auto-focusing using an absolute value image of the calculated object wave field by changing a position of the virtual focal plane using a contrast value of the absolute value image of the calculated object wave field.

2. The apparatus for capturing a Fourier hologram of claim 1, wherein:
   the controller changes the position of the virtual focal plane on the basis of a comparison result between the contrast value of the absolute value image of the calculated object wave field and a contrast value of an absolute value image of the previously calculated object wave field.

3. The apparatus for capturing a Fourier hologram of claim 1, wherein:
the controller changes a distance from the focal plane to the image sensor face by a set increment value and updates the increment value until the contrast value of the absolute value image of the calculated object wave field becomes maximum, and
a distance from the position of the virtual focal plane to a central coordinate plane of the spatial light modulator that is virtually positioned is calculated on the basis of the distance from the focal plane to the image sensor face.

4. The apparatus for capturing a Fourier hologram of claim 3, wherein:
the controller updates the increment value by a value obtained by dividing a difference between the contrast value of the absolute value image of the calculated object wave field and a contrast value of an absolute value image of the previously calculated object wave field by a set increment ratio.

5. The apparatus for capturing a Fourier hologram of claim 1, wherein:
the phase generating unit further includes:
a spherical wave field data generator generating the spherical wave field data and outputting the spherical wave field data to the spatial light modulator; and
a beam splitter making the reference beam split by the light source splitting unit incident to the spatial light modulator.

6. The apparatus for capturing a Fourier hologram of claim 5, wherein:
the phase generating unit further includes a filtering optical system removing noise from the spherical wave field.

7. The apparatus for capturing a Fourier hologram of claim 1, wherein:
the wave field synthesizing unit includes:
a first beam splitter forming the spherical wave field and the object wave field on the image sensor face; and
a second beam splitter transmitting the object beam to the subject and outputting the object wave field reflected from the subject to the first beam splitter.

* * * * *